(12) United States Patent
Slattery et al.

(10) Patent No.: US 11,428,329 B2
(45) Date of Patent: Aug. 30, 2022

(54) VALVE HAVING A POPPET WITH A SOFT SEAL AND FEATURES ENHANCING LIFE OF THE SOFT SEAL

(71) Applicant: Parker-Hannifin Corporation, Cleveland, OH (US)

(72) Inventors: Brian B. Slattery, Hicksville, OH (US); Bipin Kashid, Strongsville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/372,610

(22) Filed: Jul. 12, 2021

(65) Prior Publication Data

US 2022/0074501 A1    Mar. 10, 2022

Related U.S. Application Data

(60) Provisional application No. 63/076,405, filed on Sep. 10, 2020.

(51) Int. Cl.
*F16K 1/46* (2006.01)
*F16K 1/38* (2006.01)
*F16K 47/04* (2006.01)

(52) U.S. Cl.
CPC .............. *F16K 1/46* (2013.01); *F16K 1/38* (2013.01); *F16K 47/04* (2013.01)

(58) Field of Classification Search
CPC ............. F16K 1/46; F16K 1/38; F16K 47/04
See application file for complete search history.

(56) References Cited

U.S. PATENT DOCUMENTS

| | | |
|---|---|---|
| 2,845,945 A | 8/1958 | Mancusi, Jr. |
| 3,200,839 A | 8/1965 | Gallagher |
| 4,172,469 A | 10/1979 | Boehringer |

(Continued)

FOREIGN PATENT DOCUMENTS

| | | |
|---|---|---|
| CN | 209621750 U | 11/2019 |
| FR | 1 481 723 A | 5/1967 |

(Continued)

OTHER PUBLICATIONS

Extended European Search Report prepared by the European Patent Office in Application No. EP 21 18 5117.5 dated Jan. 12, 2022.

*Primary Examiner* — Eric Keasel
(74) *Attorney, Agent, or Firm* — McDonnell Boehnen Hulbert & Berghoff LLP

(57) ABSTRACT

An example valve includes a valve body having a first port and a second port; a poppet movable within the valve body and comprising (i) a conical surface, (ii) an exterior cylindrical surface, and (iii) an annular groove; and a seal disposed in the annular groove of the poppet, wherein the poppet is movable to a partially-unseated position in which the poppet moves to form a flow area allowing fluid flow from the first port to the second port, wherein the exterior cylindrical surface of the poppet forms a flow restriction with the interior surface of the valve body downstream from the flow area, wherein the conical surface is configured to direct fluid toward the interior surface of the valve body, away from the seal, and wherein the flow restriction generates back-pressure around the seal to reduce velocity of fluid around the seal.

17 Claims, 10 Drawing Sheets

(56) References Cited

U.S. PATENT DOCUMENTS

| | | | |
|---|---|---|---|
| 4,213,021 A | | 7/1980 | Alexander |
| 5,782,269 A | | 7/1998 | Seaney et al. |
| 6,145,805 A | * | 11/2000 | Smith, III ............ F02M 59/466 |
| | | | 251/48 |
| 6,250,602 B1 | * | 6/2001 | Jansen ...................... F02K 9/58 |
| | | | 251/903 |
| 6,655,653 B2 | * | 12/2003 | Walsh ................ F02M 63/0078 |
| | | | 251/210 |
| 2013/0092864 A1 | | 4/2013 | Andersson |
| 2017/0108132 A1 | | 4/2017 | Jurczyk |

FOREIGN PATENT DOCUMENTS

| | | |
|---|---|---|
| JP | 2006 153203 A | 6/2006 |
| JP | 2018-35832 A | 3/2018 |
| WO | WO 97/18410 | 5/1997 |

* cited by examiner

Distal End

Distal Direction ⬅   Proximal Direction ➡

Distal End

Distal Direction ← FIG. 6 → Proximal Direction

VALVE HAVING A POPPET WITH A SOFT SEAL AND FEATURES ENHANCING LIFE OF THE SOFT SEAL

CROSS REFERENCE TO RELATED APPLICATION

The present application claims priority to U.S. Provisional Application No. 63/076,405 filed on Sep. 10, 2020, the entire contents of all of which is herein incorporated by reference as if fully set forth in this description.

BACKGROUND

Size, body material, design, and seat type impact the way a valve works and how it stands up in harsh environments. Metal seated valves (i.e., valves having metal-to-metal contact seal) have different properties than soft seated valves (i.e., valves having non-metallic seals).

Metal seated valves usually cost more than the soft seated variety, but can leak more than a soft seated valve. Soft seated valves have sealing surfaces made out of non-metallic, thermoplastic materials like PTFE, Delrin, Nylon, and PEEK. They work in medium- or low-pressure environments and are suitable for working temperatures below 500° F. In the right conditions, soft seated valves can offer a fairly high level of sealing through their lifespan, typically more than a metal seated valve.

However, conventional soft seated valves might not withstand the same pressures as metal seated valves. It may thus be desirable to configure a soft seal valve with features that enhance the life of the soft seal used in the valve. This way, the valve is configured with the enhanced sealing ability of a soft seal, while having enhanced life for the soft seal.

It is with respect to these and other considerations that the disclosure made herein is presented.

SUMMARY

The present disclosure describes implementations that relate to a valve having a poppet with a soft seal and features enhancing life of the soft seal.

In a first example implementation, the present disclosure describes a valve. The valve includes: a valve body having a first port and a second port; a poppet movable within the valve body, wherein the poppet comprises: (i) a first conical surface having a first angle and a second conical surface having a second angle, such that the first angle is greater than the second angle, (ii) an exterior cylindrical surface, and (iii) an annular groove; and a seal disposed in the annular groove of the poppet. The poppet is movable between at least (i) a seated position in which the seal contacts an interior surface of the valve body to block fluid flow from the first port to the second port, and (ii) a partially-unseated position in which the poppet moves to form a flow area allowing fluid flow from the first port to the second port, wherein the exterior cylindrical surface of the poppet forms a diametrical clearance restriction with the interior surface of the valve body downstream from the flow area, wherein the first conical surface is configured to direct fluid toward the interior surface of the valve body, away from the seal, and wherein the diametrical clearance restriction generates back-pressure around the seal to reduce velocity of fluid around the seal.

In a second example implementation, the present disclosure describes a method. The method includes: positioning a poppet of a valve in a seated position, wherein the valve comprises a valve body having a first port and a second port, wherein the poppet is movable within the valve body, wherein the poppet comprises an annular groove, and wherein the valve further comprises a seal disposed in the annular groove of the poppet, wherein when the poppet is positioned in the seated position, the seal contacts an interior surface of the valve body to block fluid flow from the first port to the second port; moving the poppet to a partially-unseated position in which a flow area is formed between the poppet and the interior surface of the valve body, allowing fluid flow from the first port to the second port, wherein in the partially-unseated position a flow restriction is formed downstream from the flow area; directing fluid toward the interior surface of the valve body, away from the seal, when the poppet is in the partially-unseated position; and generating, by the flow restriction, back-pressure around the seal to reduce velocity of fluid around the seal.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

The present disclosure relates to valve having a poppet with features that protect a soft seal mounted to the poppet during operation so as to enhance the life of the soft seal. Particularly, the valve is configured such that as the poppet moves off its seat, flow rate is reduced as opposed to allowing fluid at high flow rate to suddenly rush through the valve. Also, the fluid is directed away from the soft seal as the poppet moves off the seat. Further, the valve has features to create a back-pressure at the soft seal to reduce velocity of fluid and have an enhanced pressure gradient (e.g., a substantially consistent pressure level) around the soft seal, thereby enhancing its life.

The term "soft seal" is used herein to indicate a seal made of non-metallic materials (e.g., rubber, elastomers, polymers, thermoplastic materials, etc.). In this disclosure, a check valve is used as an example to illustrate the features of the valve. However, it should be understood that other types of valves (e.g., a shuttle valve) can be configured with the same features. Further, the valve (e.g., the check valve) can be a standalone valve, or can be integrated into another valve assembly such as a sectional valve.

Figure 2:
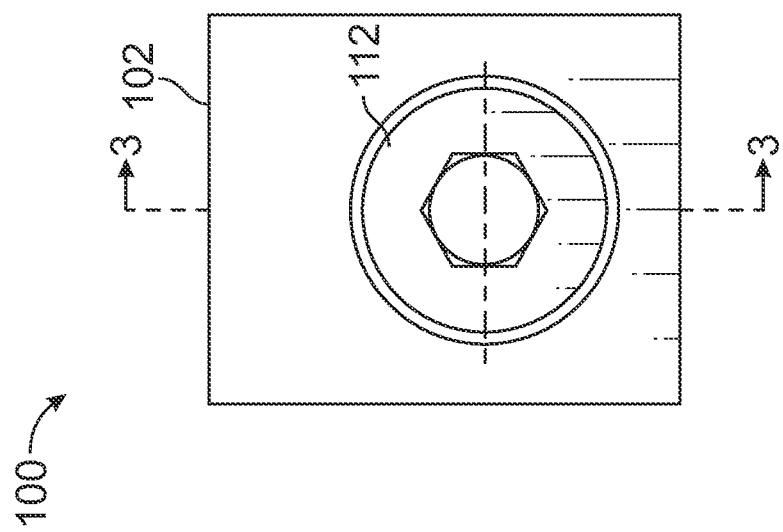
FIG. 2 illustrates a side view of the valve of FIG. 1, in accordance with an example implementation.
Figure 1:
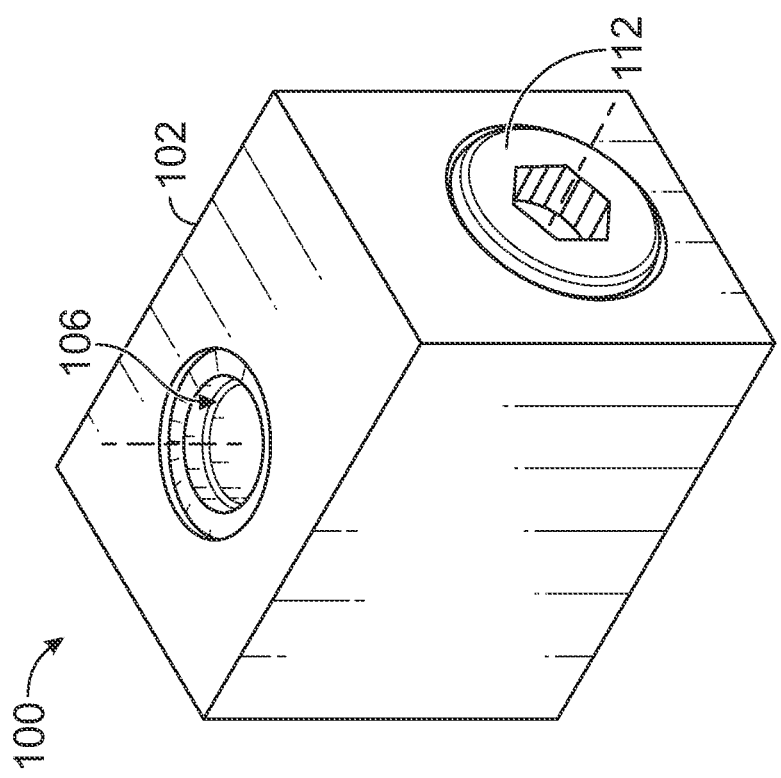
FIG. 1 illustrates a perspective view of a valve, in accordance with an example implementation.
Figure 3:
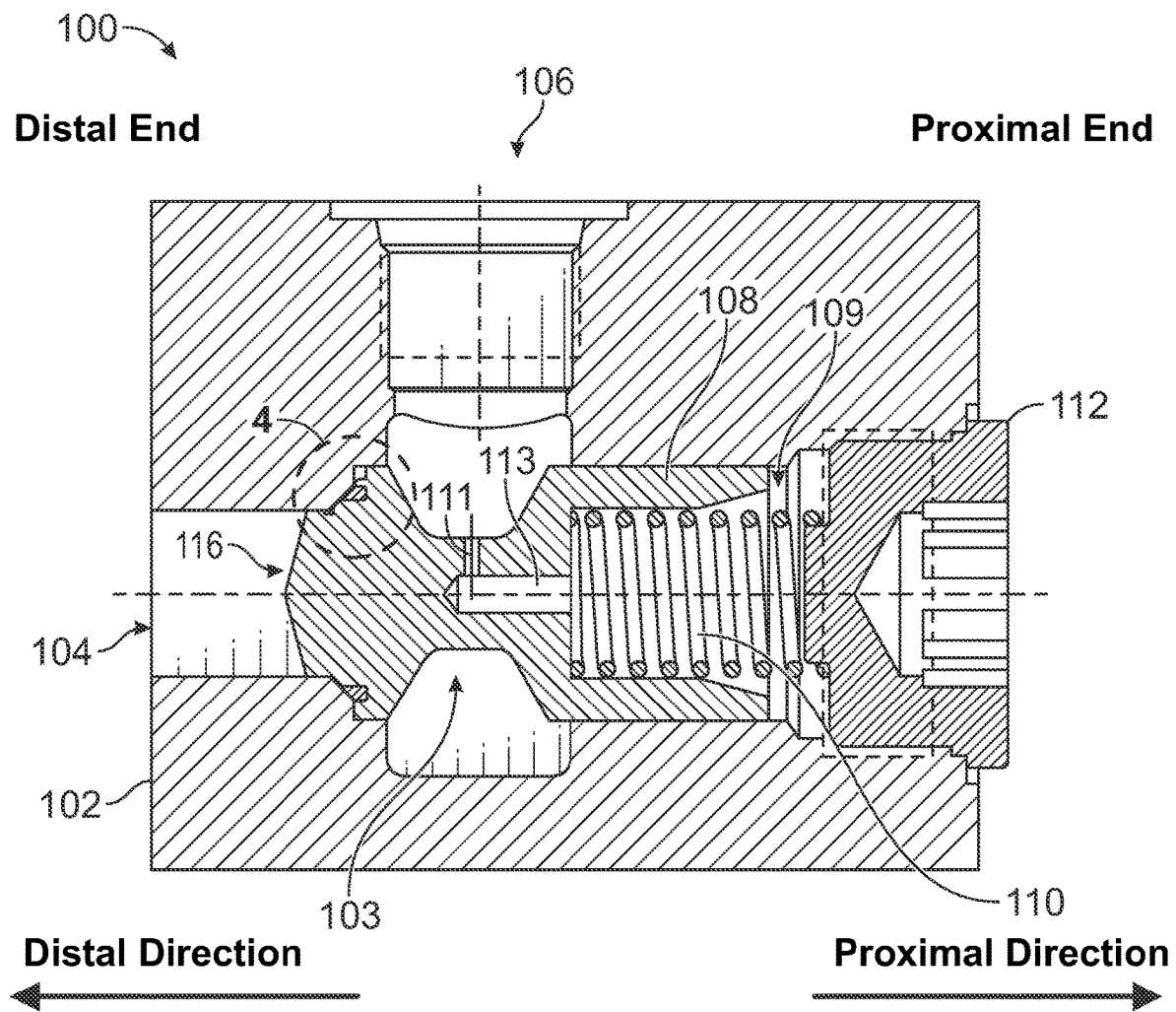
FIG. 3 illustrates a cross-sectional side view of the valve as labelled in FIG. 2, in accordance with another example implementation.
Figure 4:
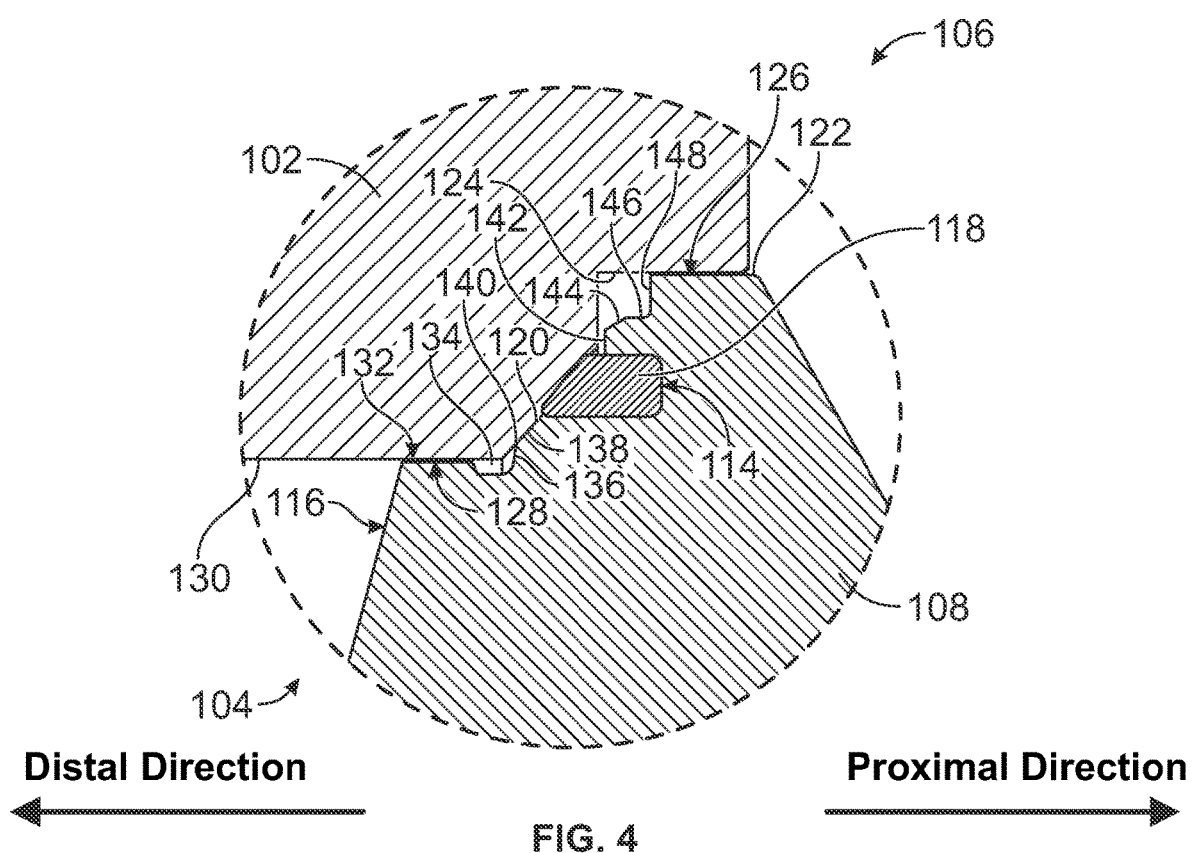
FIG. 4 illustrates an enlarged partial cross-sectional view of the valve of FIG. 3, in accordance with an example implementation.

FIG. 1 illustrates a perspective view of a valve 100, FIG. 2 illustrates a side view of the valve 100, FIG. 3 illustrates a cross-sectional side view of the valve 100 as labelled in FIG. 2, and FIG. 4 illustrates an enlarged partial cross-sectional view of the valve of FIG. 3, in accordance with an example implementation. FIGS. 1-4 are described together.

The valve 100 includes a valve body 102 including a first port 104 and a second port 106. The valve body 102 also defines a longitudinal cavity 103 therein. The longitudinal cavity 103 is aligned with the first port 104 and is perpendicular to the second port 106.

The valve 100 also includes a poppet 108 movable in the longitudinal cavity 103 within the valve body 102. The first port 104 is disposed longitudinally at a nose of the poppet 108, whereas the second port 106 is lateral to the poppet 108.

The valve 100 further includes a biasing element such as a spring 110 disposed in a cavity 109 formed within the poppet 108. As shown, the valve 100 includes a plug 112 threaded into the valve body 102. A proximal end of the spring 110 rests against the plug 112, whereas the distal end of the spring 110 rests against a respective interior surface of the poppet 108. The plug 112 is fixed (e.g., screwed into the valve body 102), and thus the spring 110 biases the poppet 108 toward the seated position shown in FIGS. 3-4 where the poppet is seated against the interior surface of the valve body 102 to block fluid flow between the first port 104 and the second port 106. The term "block" is used herein to indicate substantially preventing fluid flow except for minimal or leakage flow of drops per minute, for example.

Additionally, in some examples, fluid from the second port 106 can flow through a cross-hole 111 and a blind channel 113 formed in the poppet 108 to the cavity 109. As such, the cross-hole 111 and the blind channel 113 form an internal fluid path that communicates fluid from the second port 106 to the cavity 109. In this example, the diameter of the poppet 108 at its back (proximal) end can be made slightly larger than its respective diameter at its front (distal) end. As a result of such differential area, fluid in the cavity 109 may apply a fluid force on the poppet 108 in the distal direction to bias the poppet 108 in the distal direction toward a seated position.

Figure 5:
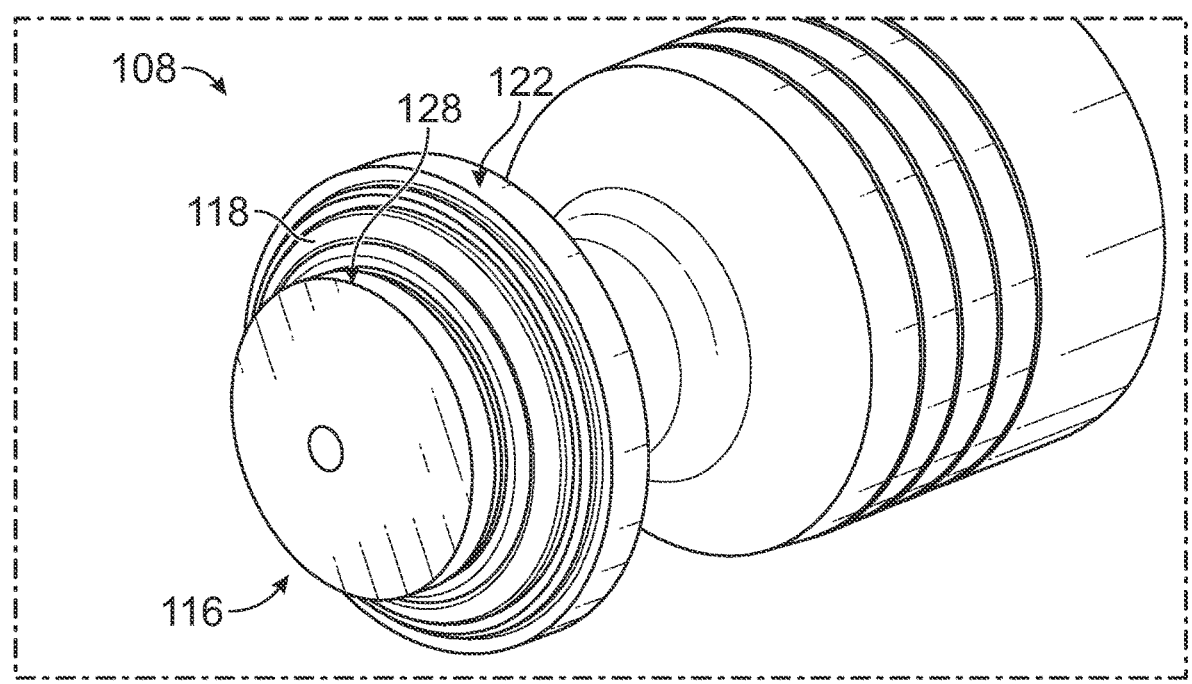
FIG. 5 illustrates a perspective view of a poppet of the valve of FIGS. 1-4, in accordance with an example implementation.

FIG. 5 illustrates a perspective view of the poppet 108, in accordance with an example implementation. Referring to FIGS. 4-5 together, the poppet 108 has an annular groove 114 formed in a distal end or distal end face 116 of the poppet 108, and the annular groove 114 defines or is bounded by three surfaces and accommodate a seal 118. The seal 118 can be a face seal configured as a soft seal that can be made of a rubber, elastomer, polymer, or thermoplastic material. For example, the seal 118 can be a Viton® O-ring. The seal 118 can be bonded with an adhesive material to the three surfaces bounding the annular groove 114.

In the closed or seated position shown in FIGS. 3-4, the seal 118 seals against an interior inclined surface 120 of the valve body 102, which operates as a seat for the poppet 108. Due to the seal 118 being made of a soft material, as the seal 118 is pressed against the hard interior surface of the valve body 102, the seal 118 deforms and conforms to the microstructure of the valve body 102 interacting therewith. Thus, the interior surface of the valve body 102 and the seal 118 form a bond at their contact area, thereby sealing the first port 104 from the second port 106.

In the cross-sectional view of FIG. 4, each inclined surface of the valve body 102 or the poppet 108 is a conical surface as illustrated in the perspective view of FIG. 5. Similarly, each horizontal line of the poppet 108 or the valve body 102 in the cross-sectional view of FIG. 4 represents a cylindrical surface, and each point in poppet 108 or the valve body 102 represents a circular line.

As shown in FIGS. 4-5, the poppet 108 has an exterior cylindrical surface 122 disposed opposite or facing an interior cylindrical surface 124 of the valve body 102 proximate the second port 106. The outer diameter of the poppet 108 at the exterior cylindrical surface 122 is smaller than an inner diameter of the valve body 102 at the interior cylindrical surface 124 such that a first diametrical clearance restriction 126 (e.g., a gap) is formed therebetween.

Similarly, the poppet 108 has an exterior cylindrical surface 128 (at the nose of the poppet 108) disposed opposite or facing an interior cylindrical surface 130 of the valve body 102 proximate the first port 104. The outer diameter of the poppet 108 at the exterior cylindrical surface 128 is smaller than an inner diameter of the valve body 102 at the interior cylindrical surface 130 such that a second diametrical clearance restriction 132 is formed therebetween.

The poppet 108 has several conical surfaces between the two exterior cylindrical surfaces 122, 128. However, the conical surfaces do not have a consistent angle, but rather has several different taper angles. Particularly, tracing the exterior surface of the poppet 108 from its distal end in a proximal direction, the poppet 108 includes an annular groove 134 adjacent the exterior cylindrical surface 128. The annular groove 134 then leads to a first conical surface 136 having a steep angle (see angle $\theta_1$ in FIG. 7 between the first conical surface 136 with a horizontal or longitudinal line in FIG. 7).

The first conical surface 136 then connects with a second conical surface 138 at seat contact line 140 at the intersection between the first conical surface 136 and the second conical surface 138. The second conical surface 138 has an angle (see angle θ2 between the second conical surface 138 with a horizontal or longitudinal line in FIG. 7) that is smaller than the respective angle of the first conical surface 136. As examples for illustration, the angle of the first conical surface 136 can be about 75 degrees, whereas the angle of the second conical surface 138 can be about 45 degrees.

In an example, the angle of the interior inclined surface 120 of the valve body 102 (i.e., the angle that the line representing the interior inclined surface 120 makes with a horizontal line) can be an angle that is greater than the angle of the second conical surface 138 but smaller than the angle of the first conical surface 136. For instance, if the angle of the second conical surface 138 is about 45 degrees and the angle of the first conical surface 136 is about 75 degrees, the angle of the interior inclined surface 120 can be about 50 degrees.

With this difference in angle, the first conical surface 136 and the second conical surface 138 meet at a corner or the seat contact line 140 that is configured as a protrusion in the distal end face 116 of the poppet 108.

The seat contact line 140 is shown as a point (e.g., a corner) that connects the first conical surface 136 with the second conical surface 138; however, it should be understood that the seat contact line 140 of the poppet 108 is a circular line that contacts or sits at the interior inclined surface 120 of the valve body 102 to form a metal-to-metal seal when the valve 100 is in a closed position. The metal-to-metal seal between the seat contact line 140 and the valve body 102 may provide sealing functionality. However, the primary sealing function may be performed by the seal 118 disposed in the annular groove 114 formed in the distal end face 116 of the poppet 108.

The second conical surface 138 then leads to the annular groove 114 that receives the seal 118. The annular groove 114 is then followed by an annular face 142 (represented as a vertical line in FIG. 4). The annular face 142 then connects with a third conical surface 144 having an angle (see angle $\theta_3$ between the third conical surface 144 with a horizontal or longitudinal line in FIG. 9) that may be the same as or less than the angle of the second conical surface 138. As an example, the angle of the third conical surface 144 can be about 25 degrees. The seal 118 is disposed between or straddled by, the second conical surface 138 and the third conical surface 144.

The third conical surface 144 is followed by a cylindrical surface 146, which then leads to an annular face 148 (vertical line in FIG. 4). The annular face 148 then leads to the exterior cylindrical surface 122 of the poppet 108.

This configuration of the poppet 108 and the valve body 102 protects the seal 118 and enhances its life compared to conventional soft seal valve configurations. Particularly, assuming high pressure fluid is provided to the first port 104, as the pressurized fluid pushes the poppet 108 in the proximal direction to move it to an unseated position, the features of the poppet 108 and the valve body 102 reduce the velocity of fluid around the seal 118. Further, the inlet fluid jet is directed toward the interior inclined surface 120 of the valve body 102 rather than the seal 118 to protect the seal 118 from the fluid jet.

Figure 6:
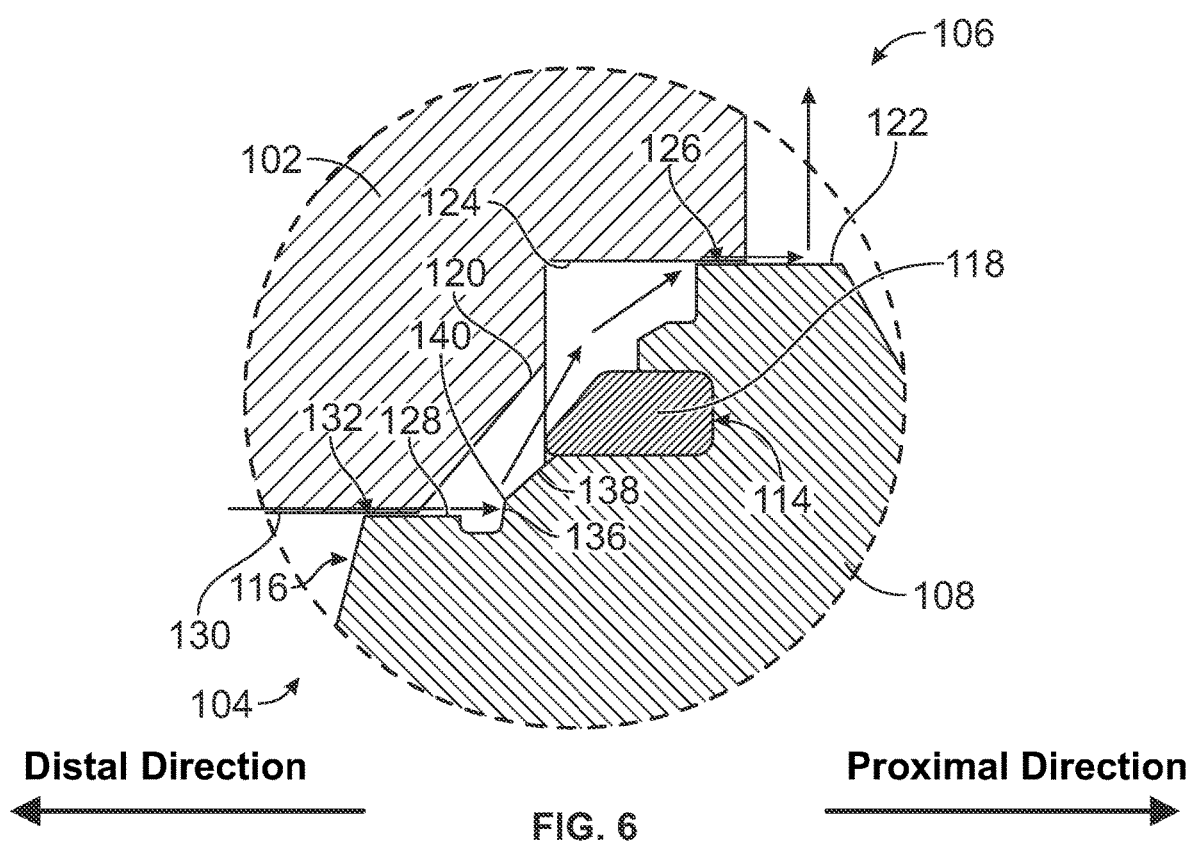
FIG. 6 illustrates an enlarged partial cross-sectional view of the valve of FIG. 3 with arrows representing fluid flow through the valve when a poppet is partially-unseated, in accordance with an example implementation.
Figure 7:
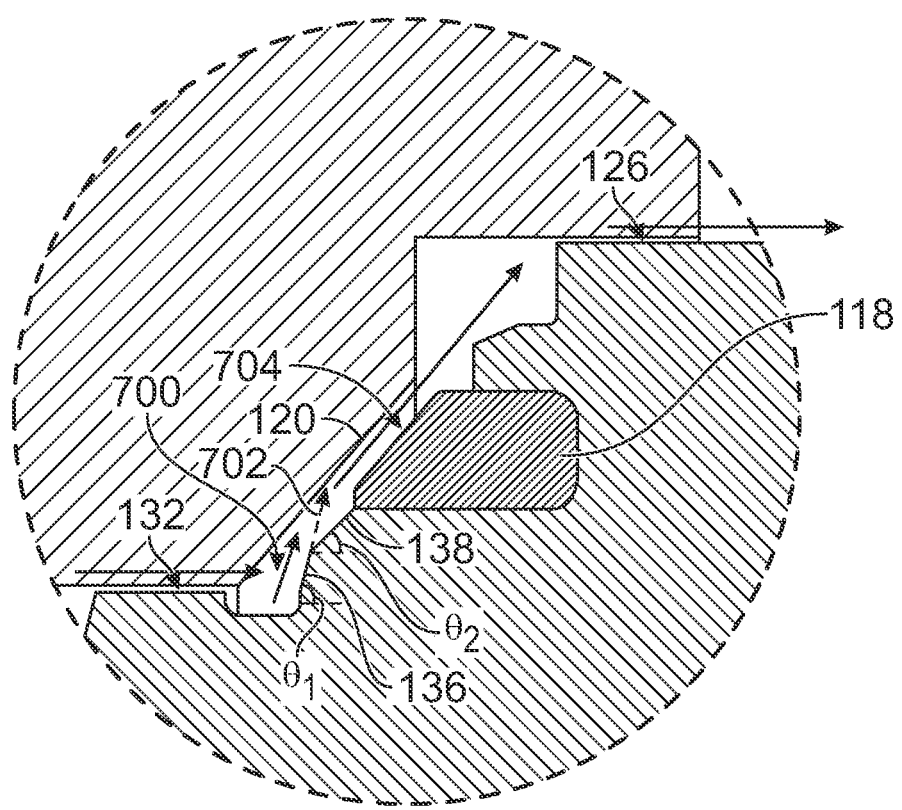
FIG. 7 illustrates an enlarged partial cross-sectional view of a poppet partially-unseated from a valve body, in accordance with an example implementation.

FIG. 6 illustrates an enlarged partial cross-sectional view of the valve of FIG. 3 with arrows representing fluid flow through the valve 100 when the poppet 108 is partially-unseated, and FIG. 7 illustrates an enlarged partial cross-sectional view of the poppet 108 partially-unseated from the valve body 102, in accordance with an example implementation. In other words, FIGS. 6-7 illustrates the poppet 108 in a partial stroke position between a closed or seated position and a fully-shifted or fully-unseated position (see FIG. 8B). The terms "fully-shifted," "fully-open," and "fully-unseated" can be used interchangeably herein.

The term "seated" position indicates a position of the poppet 108 where the seat contact line 140 and/or the seal 118 contact the inner surface (e.g., the interior inclined surface 120) of the valve body 102, which operates as a seat for the poppet 108. "Unseated" position, indicates that the poppet 108 has moved off the seat, thereby allowing fluid flow between the first port 104 and the second port 106.

When pressurized fluid is provided to the first port 104, pressure level can increase at the distal end of the poppet 108 until it is sufficient to overcome the biasing force of the spring 110, thereby causing the poppet 108 to be unseated (i.e., moves in the proximal direction to the right in FIG. 6). Once the poppet 108 "cracks" open, fluid starts to flow from the first port 104 through the second diametrical clearance restriction 132.

Referring to FIG. 7, fluid then flows through a flow area 700 (i.e., space formed between poppet 108 and the interior surface of the valve body 102 as the poppet 108 is unseated). Due to the angle $\theta_1$ of the first conical surface 136 being greater than the angle $\theta_2$ of the second conical surface 138, fluid is directed by the first conical surface 136 toward the interior inclined surface 120 of the valve body 102 as represented by arrow 702, rather than toward the seal 118. As such, the configuration of the poppet 108 protects the seal 118 from the initial gush of fluid that flows through the valve 100, and fluid is directed away from the seal 118. As mentioned above, as an illustrative example, $\theta_1$ can be about 75 degrees, $\theta_2$ can be about 45 degrees, and the angle of the interior inclined surface 120 of the valve body 102 can be about 50 degrees. These angles are example for illustration only and other angles that maintains the relationship between the angles $\theta_1$ and $\theta_2$ could be used.

Fluid then continues through a flow area zone 704 around the seal 118 toward the first diametrical clearance restriction 126, then toward the second port 106. The first diametrical clearance restriction 126 is configured to operate as an orifice or flow restriction downstream of the flow area zone 704. As a result of the first diametrical clearance restriction 126 restricting fluid flow downstream of the flow area zone 704, back-pressure (e.g., an increased pressure level) is generated at the flow area zone 704 around the seal 118.

As such, the flow area zone 704 operate as a dampening chamber. Particularly, the first diametrical clearance restriction 126 restricts fluid flow therethrough, and therefore generates an increased bulk static pressure at the flow area zone 704. In other words, as fluid flows through the flow area zone 704, fluid decelerates converting excess kinetic energy into pressure as the fluid slows. As such, fluid slows down around the seal 118 while pressure level increases. As a result of such increased bulk static pressure at the flow area zone 704: the likelihood of formation of cavitation bubbles in the flow area 700 generally, and the flow area zone 704 particularly, may be reduced, and (ii) the velocity of fluid flowing through the flow area zone 704 is reduced, thereby reducing the likelihood of damaging (i.e., "nibbling" away) the seal 118.

In examples, additionally, the valve 100 can be configured to have the second diametrical clearance restriction 132 upstream of the flow area zone 704, which restricts fluid flow rate from the first port 104 when the poppet 108 is unseated. Such limiting of flow rate may protect the seal 118 from a sudden gush of fluid flow as the poppet 108 is unseated. However, without the second diametrical clearance restriction 132, the configuration of the poppet 108 with the dual-angle surface (i.e., the angle of the first conical surface 136 being different from the angle of the second conical surface 138) directing fluid away from the seal 118, and the first diametrical clearance restriction 126 generating a back-pressure in the flow area zone 704 around the seal 118 may sufficiently protect the seal 118 and enhance its life.

Figure 8A:
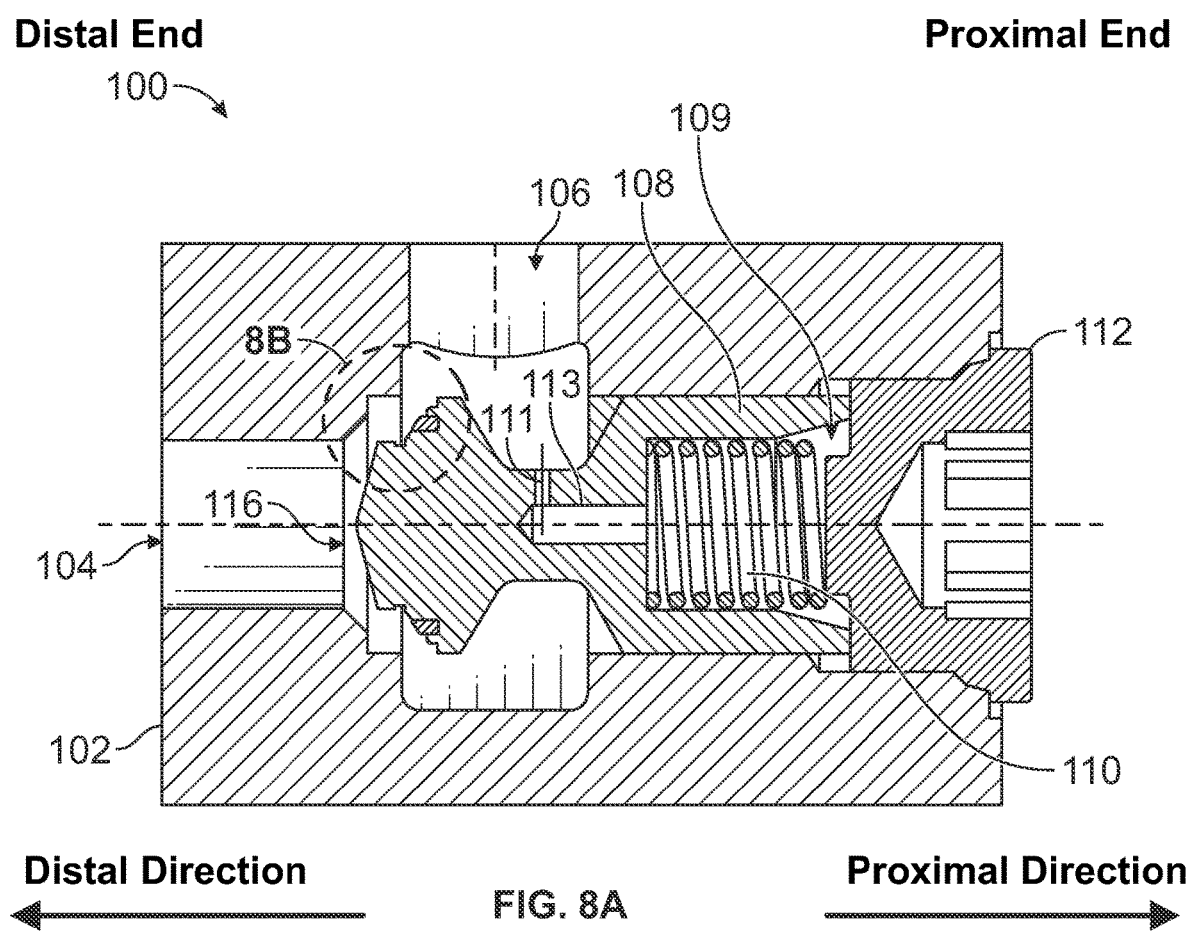
FIG. 8A illustrates a cross-sectional side view of the valve with a poppet in a fully-unseated position, in accordance with an example implementation.
Figure 8B:
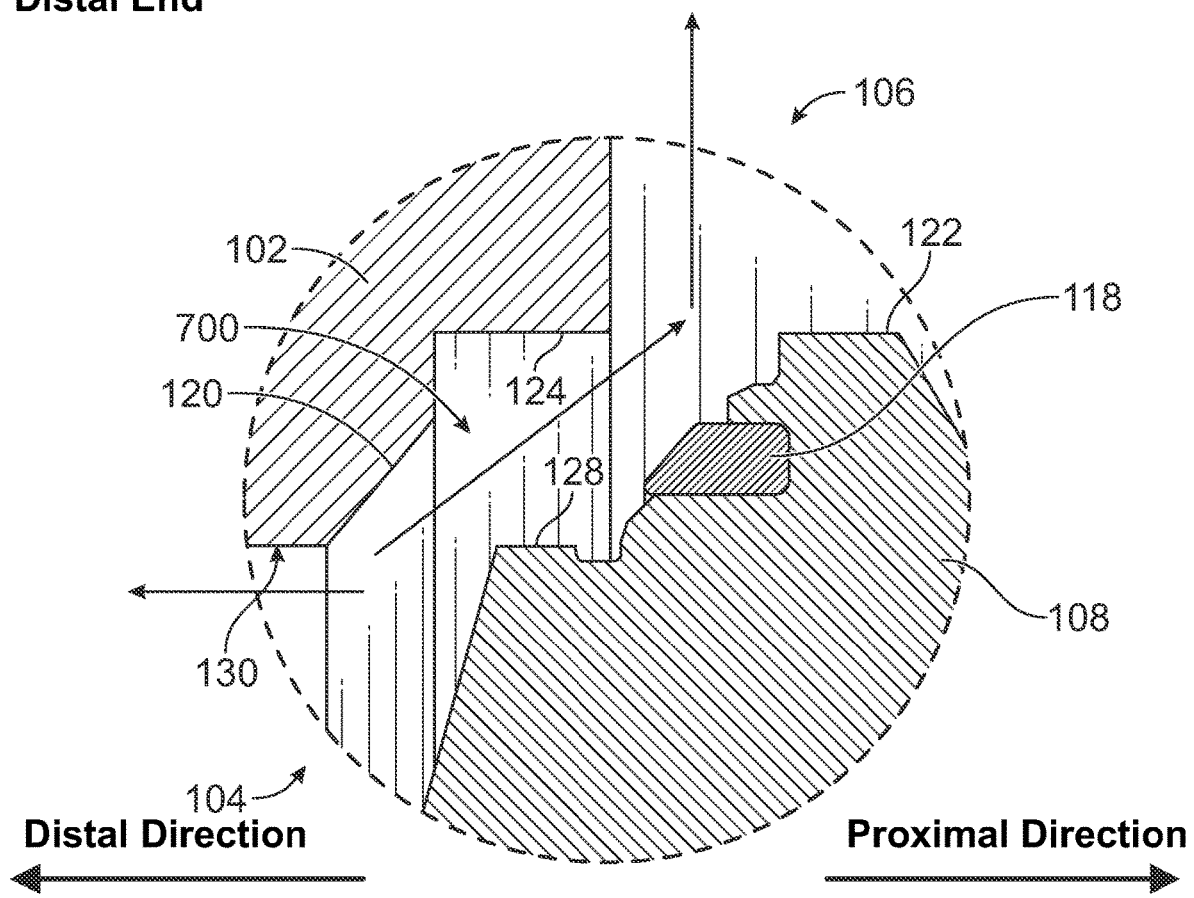
FIG. 8B illustrates an enlarged partial cross-sectional view of a poppet in a fully-unseated position, in accordance with an example implementation.

The poppet 108 can continue moving in the proximal direction under pressure from the fluid at the first port 104. FIG. 8A illustrates a cross-sectional side view of the valve 100 with the poppet 108 in a fully-unseated position, and FIG. 8B illustrates an enlarged partial cross-sectional view of the poppet 108 in the fully-unseated position, in accordance with an example implementation. As shown in FIGS.

8A-8B, the poppet 108 is fully shifted and the flow area 700 is enlarged. In this position, the proximal end of the poppet 108 may contact the plug 112.

In this position, fluid can flow freely past the poppet 108, and the seal 118 is largely out of the way. Also, notably, the poppet 108 shifted such that the diametrical clearance restrictions 126, 132 are no longer formed between the poppet 108 and the valve body 102, and there is no restriction of the fluid flow. Particularly, the exterior cylindrical surface 122 disengages from (i.e., no longer overlaps) the interior cylindrical surface 124, and the exterior cylindrical surface 128 disengages from (i.e., no longer overlaps) the interior cylindrical surface 130 such that the diametrical clearance restrictions 126, 132 are no longer formed.

In examples, the valve 100 can be configured to be bidirectional, allowing fluid flow from the first port 104 to the second port 106 as described above, and also allowing fluid flow from the second port 106 to the first port 104. In this example, the valve 100 may be configured to fluidly couple the cavity 109 to a fluid reservoir to reduce pressure level in the cavity 109. For example, the cavity 109 may be fluidly coupled to the fluid reservoir via a normally-closed solenoid-operated valve. When the solenoid-operated valve is actuated, it opens, thereby allowing fluid in the cavity 109 to be relieved to the fluid reservoir, reducing pressure level in the cavity 109.

Once pressure level in the cavity 109 is reduced, pressurized fluid at the second port 106 can push the poppet 108 in the proximal direction against the spring 110, unseating the poppet 108. As a result, fluid can flow from the second port 106 to the first port 104. The valve 100 is configured with features that protect the seal 118 when fluid flows from the second port 106 to the first port 104, similar to the features that protect the seal 118 when fluid flows from the first port 104 to the second port 106.

Figure 9:
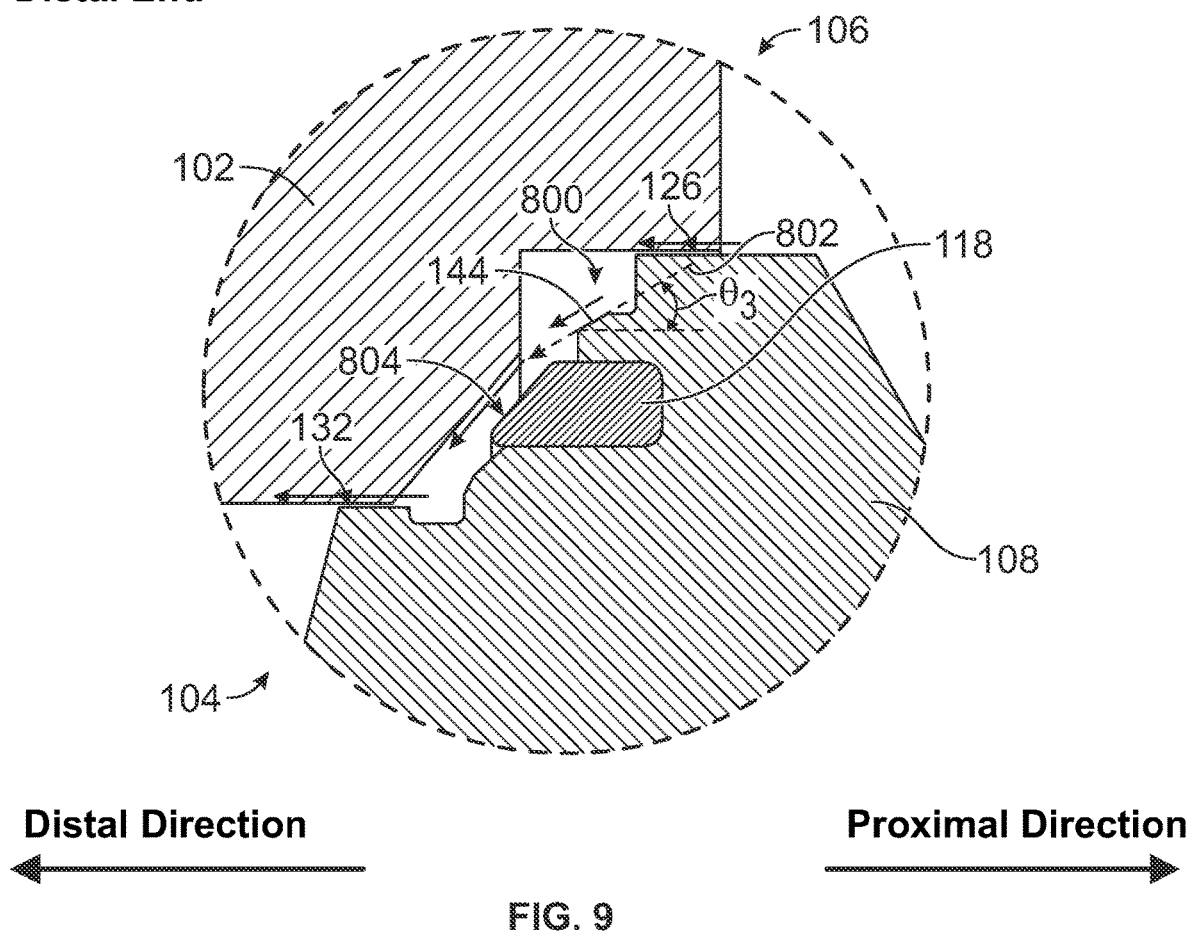
FIG. 9 illustrates an enlarged partial cross-sectional view of the valve of FIG. 3 with arrows representing fluid flow from a second port to a first port when a poppet is unseated, in accordance with an example implementation.

FIG. 9 illustrates an enlarged partial cross-sectional view of the valve of FIG. 3 with arrows representing fluid flow from the second port 106 to the first port 104 when the poppet 108 is unseated, in accordance with an example implementation. Once the poppet 108 "cracks" open, fluid starts to flow from the second port 106 through the first diametrical clearance restriction 126. Fluid then flows through a flow area 800 (i.e., space formed between poppet 108 and the interior surface of the valve body 102 as the poppet 108 is unseated). Due to the angle $\theta_3$ (e.g., an angle of 25 degrees) of the third conical surface 144, fluid is directed by the third conical surface 144 toward the interior surface of the valve body 102 as represented by arrow 802, rather than toward the seal 118. As such, the configuration of the poppet 108 protects the seal 118 from the initial gush of fluid that flows through the valve 100, and fluid is directed away from the seal 118.

Fluid then continues through a flow area zone 804 around the seal 118 toward the second diametrical clearance restriction 132, then toward the first port 104. The second diametrical clearance restriction 132 is configured to operate as an orifice or flow restriction downstream of the flow area zone 804. As a result of the second diametrical clearance restriction 132 restricting fluid flow downstream of the flow area zone 804, back-pressure (e.g., an increased pressure level) is generated at the flow area zone 804 around the seal 118.

Thus, the second diametrical clearance restriction 132 restricts fluid flow therethrough, and therefore generates an increased bulk static pressure at the flow area zone 804. In other words, as fluid flows through the flow area zone 804, fluid decelerates converting excess kinetic energy into pressure as the fluid slows. As such, fluid slows down around the seal 118 while pressure level increases. As a result of such increased bulk static pressure at the flow area zone 804: the likelihood of formation of cavitation bubbles in the flow area 800 generally, and the flow area zone 804 particularly may be reduced, and (ii) the velocity of fluid flowing through the flow area zone 804 is reduced, thereby reducing the likelihood of damaging (i.e., "nibbling" away) the seal 118.

Figure 10:
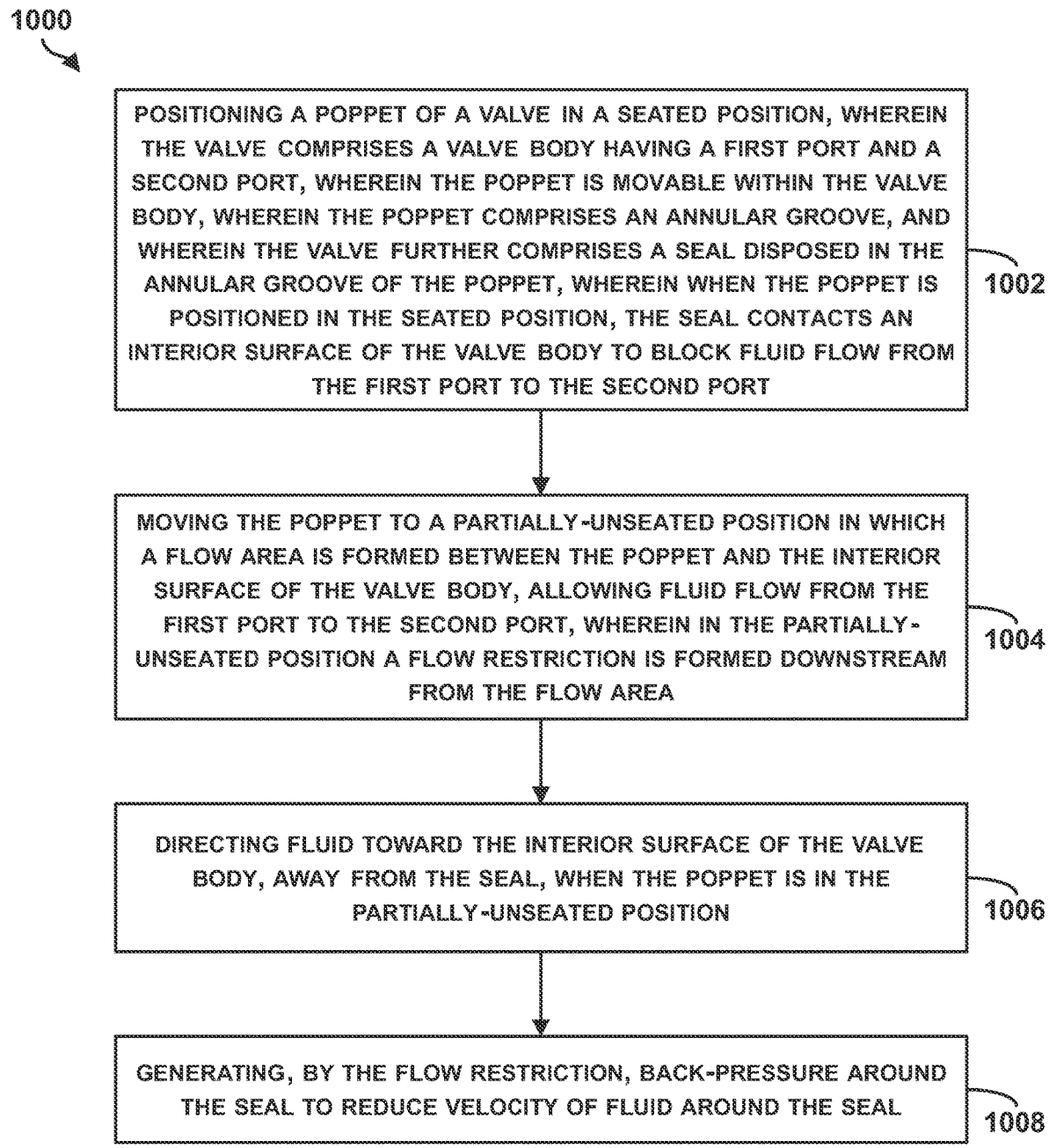
FIG. 10 is a flowchart of a method for operating a valve, in accordance with an example implementation.

FIG. 10 is a flowchart of a method 1000 for operating a valve, in accordance with an example implementation. The method 1000 can be used for operating the valve 100, for example.

The method 1000 may include one or more operations, functions, or actions as illustrated by one or more of blocks 1002-1008. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1002, the method 1000 includes positioning a poppet (e.g., the poppet 108) of a valve (e.g., the valve 100) in a seated position (see FIGS. 3-4), wherein the valve comprises a valve body (e.g., the valve body 102) having a first port (e.g., the first port 104) and a second port (e.g., the second port 106), wherein the poppet is movable within the valve body, wherein the poppet comprises an annular groove (e.g., the annular groove 114), and wherein the valve further comprises a seal (e.g., the seal 118) disposed in the annular groove of the poppet, wherein when the poppet is positioned in the seated position, the seal contacts an interior surface (e.g., the interior inclined surface 120) of the valve body to block fluid flow from the first port to the second port.

At block 1004, the method 1000 includes moving the poppet to a partially-unseated position (see FIGS. 6-7) in which a flow area (e.g., the flow area 700 and/or the flow area zone 704) is formed between the poppet and the interior surface of the valve body, allowing fluid flow from the first port to the second port, wherein in the partially-unseated position a flow restriction (e.g., the first diametrical clearance restriction 126) is formed downstream from the flow area.

At block 1006, the method 1000 includes directing fluid toward the interior surface of the valve body, away from the seal, when the poppet is in the partially-unseated position. As described above, the first conical surface 136 directs fluid toward the interior inclined surface 120 of the valve body 102 (see the arrow 702), away from the seal 118.

At block 1008, the method 1000 includes generating, by the flow restriction, back-pressure around the seal to reduce velocity of fluid around the seal. As described above, the first diametrical clearance restriction 126 causes or generates back-pressure at the flow area zone 704, thereby causing velocity of fluid to be reduced around the seal 118.

The method 1000 can further include other steps described herein such as restricting fluid flow via the second diametrical clearance restriction 132 upstream of the flow area 700.

Additionally, the first diametrical clearance restriction 126 upstream of the flow area zone 804 restricts fluid flow rate from the second port 106 when the poppet 108 is unseated. Such limiting of flow rate may protect the seal 118 from a sudden gush of fluid flow as the poppet 108 is unseated.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a valve body having a first port and a second port; a poppet movable within the valve body, wherein the poppet comprises: (i) a first conical surface having a first angle and a second conical surface having a second angle, such that the first angle is greater than the second angle, (ii) an exterior cylindrical surface, and (iii) an annular groove; and a seal disposed in the annular groove of the poppet, wherein the poppet is movable between at least (i) a seated position in which the seal contacts an interior surface of the valve body to block fluid flow from the first port to the second port, and (ii) a partially-unseated position in which the poppet moves to form a flow area allowing fluid flow from the first port to the second port, wherein the exterior cylindrical surface of the poppet forms a diametrical clearance restriction with the interior surface of the valve body downstream from the flow area, wherein the first conical surface is configured to direct fluid toward the interior surface of the valve body, away from the seal, and wherein the diametrical clearance restriction generates back-pressure around the seal to reduce velocity of fluid around the seal.

EEE 2 is the valve of EEE 1, wherein the interior surface of the valve body comprises an interior inclined surface, wherein the first conical surface of the poppet connects with the second conical surface at a seat contact line configured to contact the interior inclined surface of the valve body when the poppet is in the seated position to form a metal-to-metal seal.

EEE 3 is the valve of EEE 2, wherein the seal is made of a non-metallic material, wherein the seal contacts the interior inclined surface of the valve body to form a soft seal when the poppet is in the seated position.

EEE 4 is the valve of any of EEEs 1-3, wherein the exterior cylindrical surface is a first exterior cylindrical surface, wherein the diametrical clearance restriction is a first diametrical clearance restriction, wherein the poppet further comprises a second exterior cylindrical surface forming a second diametrical clearance restriction with the interior surface of the valve body upstream of the flow area when the poppet is in the partially-unseated position, wherein the second diametrical clearance restriction restricts fluid flow from the first port when the poppet is in the partially-unseated position.

EEE 5 is the valve of any of EEEs 1-4, wherein the first port is aligned longitudinally with the poppet, and wherein the second port is disposed laterally relative to the poppet.

EEE 6 is the valve of any of EEEs 1-5, further comprising: a spring disposed in a cavity within the poppet and configured to bias the poppet to the seated position in which the poppet contacts the interior surface of the valve body.

EEE 7 is the valve of EEE 6, wherein the poppet comprises an internal fluid path configured to provide fluid to the cavity.

EEE 8 is the valve of EEE 7, wherein a diameter of a proximal end of the poppet is larger than a respective diameter of a distal end of the poppet such that fluid in the cavity applies a fluid force to the poppet in a distal direction toward the seated position.

EEE 9 is the valve of any of EEEs 6-8, further comprising: a plug coupled to the valve body, wherein a proximal end of the spring rests against the plug, and wherein a distal end of the spring rests against a respective interior surface of the poppet.

EEE 10 is the valve of EEE 9, wherein the poppet is movable to a fully-unseated position in which the poppet contacts the plug.

EEE 11 is the valve of EEE 10, wherein when the poppet is in the fully-unseated position, the exterior cylindrical surface of the poppet disengages from the interior surface of the valve body such that the diametrical clearance restriction is no longer formed.

EEE 12 is the valve of any of EEEs 1-11, wherein the poppet comprises a distal end face comprising the first conical surface, the second conical surface, and the annular groove.

EEE 13 is the valve of EEE 12, wherein the seal is a face seal disposed in the annular groove formed in the distal end face of the poppet.

EEE14 is the valve of any of EEEs 1-13, wherein the poppet further comprises a third conical surface having a third angle, wherein the seal is disposed between the second conical surface and the third conical surface.

EEE 15 is the valve of EEE 14, wherein the valve is bidirectional, allowing fluid flow from the second port to the first port when the poppet is unseated, and wherein the third conical surface is configured to direct fluid toward the interior surface of the valve body, away from the seal, as the poppet moves to the partially-unseated position and fluid flows from the second port to the first port.

EEE 16 is a method comprising: positioning a poppet of a valve in a seated position, wherein the valve comprises a valve body having a first port and a second port, wherein the poppet is movable within the valve body, wherein the poppet comprises an annular groove, and wherein the valve further comprises a seal disposed in the annular groove of the poppet, wherein when the poppet is positioned in the seated position, the seal contacts an interior surface of the valve body to block fluid flow from the first port to the second port; moving the poppet to a partially-unseated position in which a flow area is formed between the poppet and the interior surface of the valve body, allowing fluid flow from the first port to the second port, wherein in the partially-unseated position a flow restriction is formed downstream from the flow area; directing fluid toward the interior surface of the valve body, away from the seal, when the poppet is in the partially-unseated position; and generating, by the flow restriction, back-pressure around the seal to reduce velocity of fluid around the seal.

EEE 17 is the method of EEE 16, wherein the poppet further comprises: (i) a first conical surface having a first angle and a second conical surface having a second angle, such that the first angle is greater than the second angle, wherein directing fluid toward the interior surface of the valve body comprises: directing, by the first conical surface, fluid toward the interior surface of the valve body, away from the seal.

EEE 18 is the method of EEE 17, wherein the poppet further comprises a third conical surface having a third angle, wherein the seal is disposed between the second conical surface and the third conical surface, wherein the valve is bidirectional, allowing fluid flow from the second port to the first port when the poppet is unseated, and wherein the method further comprises: directing, by the third conical surface, fluid toward the interior surface of the valve body, away from the seal, as the poppet moves to the partially-unseated position and fluid flows from the second port to the first port.

EEE 19 is the method of any of EEEs 16-18, wherein the poppet comprises an exterior cylindrical surface, wherein the flow restriction comprises a diametrical clearance restriction formed between the exterior cylindrical surface of the poppet and the interior surface of the valve body downstream from the flow area, wherein generating the back-pressure comprises: generating, by the diametrical clearance restriction, the back-pressure around the seal.

EEE 20 is the method of EEE 19, wherein the exterior cylindrical surface is a first exterior cylindrical surface, wherein the diametrical clearance restriction is a first diametrical clearance restriction, wherein the poppet further comprises a second exterior cylindrical surface forming a second diametrical clearance restriction with the interior surface of the valve body upstream of the flow area when the poppet is in the partially-unseated position, and wherein the method further comprises: restricting, by the second diametrical clearance restriction, fluid flow from the first port when the poppet is in the partially-unseated position.

What is claimed is:

1. A valve comprising:
   a valve body having a first port and a second port;
   a poppet movable within the valve body, wherein the poppet comprises: (i) a first conical surface having a first angle and a second conical surface having a second angle, such that the first angle is greater than the second angle, (ii) an exterior cylindrical surface, and (iii) an annular groove; and
   a seal disposed in the annular groove of the poppet, wherein the poppet is movable between at least (i) a seated position in which the seal contacts an interior surface of the valve body to block fluid flow from the first port to the second port, and (ii) a partially-unseated position in which the poppet moves to form a flow area allowing fluid flow from the first port to the second port, wherein the exterior cylindrical surface of the poppet forms a diametrical clearance restriction with the interior surface of the valve body downstream from the flow area, wherein the first conical surface is configured to direct fluid toward the interior surface of the valve body, away from the seal, and wherein the diametrical clearance restriction generates back-pressure around the seal to reduce velocity of fluid around the seal, wherein the interior surface of the valve body comprises an interior inclined surface, wherein the first conical surface of the poppet connects with the second conical surface at a seat contact line configured to contact the interior inclined surface of the valve body when the poppet is in the seated position to form a metal-to-metal seal.

2. The valve of claim 1, wherein the seal is made of a non-metallic material, wherein the seal contacts the interior inclined surface of the valve body to form a soft seal when the poppet is in the seated position.

3. The valve of claim 1, wherein the exterior cylindrical surface is a first exterior cylindrical surface, wherein the diametrical clearance restriction is a first diametrical clearance restriction, wherein the poppet further comprises a second exterior cylindrical surface forming a second diametrical clearance restriction with the interior surface of the valve body upstream of the flow area when the poppet is in the partially-unseated position, wherein the second diametrical clearance restriction restricts fluid flow from the first port when the poppet is in the partially-unseated position.

4. The valve of claim 1, wherein the first port is aligned longitudinally with the poppet, and wherein the second port is disposed laterally relative to the poppet.

5. The valve of claim 1, further comprising:
   a spring disposed in a cavity within the poppet and configured to bias the poppet to the seated position in which the poppet contacts the interior surface of the valve body.

6. The valve of claim 5, wherein the poppet comprises an internal fluid path configured to provide fluid to the cavity.

7. The valve of claim 6, wherein a diameter of a proximal end of the poppet is larger than a respective diameter of a distal end of the poppet such that fluid in the cavity applies a fluid force to the poppet in a distal direction toward the seated position.

8. The valve of claim 5, further comprising:
a plug coupled to the valve body, wherein a proximal end of the spring rests against the plug, and wherein a distal end of the spring rests against a respective interior surface of the poppet.

9. The valve of claim 8, wherein the poppet is movable to a fully-unseated position in which the poppet contacts the plug.

10. The valve of claim 9, wherein when the poppet is in the fully-unseated position, the exterior cylindrical surface of the poppet disengages from the interior surface of the valve body such that the diametrical clearance restriction is no longer formed.

11. The valve of claim 1, wherein the poppet comprises a distal end face comprising the first conical surface, the second conical surface, and the annular groove.

12. The valve of claim 11, wherein the seal is a face seal disposed in the annular groove formed in the distal end face of the poppet.

13. The valve of claim 1, wherein the poppet further comprises a third conical surface having a third angle, wherein the seal is disposed between the second conical surface and the third conical surface.

14. The valve of claim 13, wherein the valve is bidirectional, allowing fluid flow from the second port to the first port when the poppet is unseated, and wherein the third conical surface is configured to direct fluid toward the interior surface of the valve body, away from the seal, as the poppet moves to the partially-unseated position and fluid flows from the second port to the first port.

15. A method comprising:
positioning a poppet of a valve in a seated position, wherein the valve comprises a valve body having a first port and a second port, wherein the poppet is movable within the valve body, wherein the poppet comprises an annular groove, and wherein the valve further comprises a seal disposed in the annular groove of the poppet, wherein when the poppet is positioned in the seated position, the seal contacts an interior surface of the valve body to block fluid flow from the first port to the second port;

moving the poppet to a partially-unseated position in which a flow area is formed between the poppet and the interior surface of the valve body, allowing fluid flow from the first port to the second port, wherein in the partially-unseated position a flow restriction is formed downstream from the flow area, wherein the poppet further comprises: (i) a first conical surface having a first angle and a second conical surface having a second angle, such that the first angle is greater than the second angle;

directing, by the first conical surface, fluid toward the interior surface of the valve body, away from the seal, when the poppet is in the partially-unseated position;

generating, by the flow restriction, back-pressure around the seal to reduce velocity of fluid around the seal, wherein the poppet further comprises a third conical surface having a third angle, wherein the seal is disposed between the second conical surface and the third conical surface, wherein the valve is bidirectional, allowing fluid flow from the second port to the first port when the poppet is unseated; and directing, by the third conical surface, fluid toward the interior surface of the valve body, away from the seal, as the poppet moves to the partially-unseated position and fluid flows from the second port to the first port.

16. The method of claim 15, wherein the poppet comprises an exterior cylindrical surface, wherein the flow restriction comprises a diametrical clearance restriction formed between the exterior cylindrical surface of the poppet and the interior surface of the valve body downstream from the flow area, wherein generating the back-pressure comprises:
generating, by the diametrical clearance restriction, the back-pressure around the seal.

17. The method of claim 16, wherein the exterior cylindrical surface is a first exterior cylindrical surface, wherein the diametrical clearance restriction is a first diametrical clearance restriction, wherein the poppet further comprises a second exterior cylindrical surface forming a second diametrical clearance restriction with the interior surface of the valve body upstream of the flow area when the poppet is in the partially-unseated position, and wherein the method further comprises:
restricting, by the second diametrical clearance restriction, fluid flow from the first port when the poppet is in the partially-unseated position.

* * * * *